(12) United States Patent
Willink

(10) Patent No.: US 7,418,045 B2
(45) Date of Patent: Aug. 26, 2008

(54) METHOD FOR UPDATING SINGULAR VALUE DECOMPOSITION OF A TRANSFER MATRIX

(75) Inventor: Tricia J. Willink, Kanata (CA)

(73) Assignee: Her Majesty the Queen in right of Canada, as represented by the Minister of Industry, Through the Communicatios Research Centre Canada, Ottawa (CA)

( * ) Notice: Subject to any disclaimer, the term of this patent is extended or adjusted under 35 U.S.C. 154(b) by 605 days.

(21) Appl. No.: 11/020,091

(22) Filed: Dec. 27, 2004

(65) Prior Publication Data

US 2005/0147183 A1 Jul. 7, 2005

Related U.S. Application Data

(60) Provisional application No. 60/534,189, filed on Jan. 2, 2004.

(51) Int. Cl.
*H04K 1/10* (2006.01)

(52) U.S. Cl. ........................ 375/260; 375/267; 375/340

(58) Field of Classification Search ................. 375/260, 375/340; 704/500; 382/248; 83/13; 707/2
See application file for complete search history.

(56) References Cited

U.S. PATENT DOCUMENTS

| | | | | |
|---|---|---|---|---|
| 5,615,288 | A * | 3/1997 | Koshi et al. ................. | 382/248 |
| 6,112,628 | A * | 9/2000 | Kline ............................ | 83/13 |
| 6,134,541 | A * | 10/2000 | Castelli et al. ................. | 707/2 |
| 6,760,388 | B2 | 7/2004 | Ketchum et al. | |
| 6,763,073 | B2 | 7/2004 | Foschini et al. | |
| 6,829,312 | B1 * | 12/2004 | Laurila et al. ............... | 375/340 |
| 2003/0200097 | A1 * | 10/2003 | Brand ......................... | 704/500 |
| 2004/0190636 | A1 * | 9/2004 | Oprea ......................... | 375/260 |

OTHER PUBLICATIONS

"Fast Calculation of Singular Values for MIMO Wireless Systems"; Dickins et al.; Australian Communications Theory Workshop Proceedings; 2003; pp. 1-6.*

"Signal Analysis Using a Multiresolution Form of the Singular Value Decomposition"; Kakarala et al.; IEEE Transactions on Image Processing; vol. 10, No. 5; May 2001; pp. 724-735.*

"Incremental singular value decomposition of uncertain data with missing values"; MERL-Mitsubishi Electric Research Laboratory; May 2002; pp. 1-12.*

(Continued)

*Primary Examiner*—Chieh M. Fan
*Assistant Examiner*—Sudhanshu C. Pathak
(74) *Attorney, Agent, or Firm*—Teitelbaum & MacLean; Neil Teitelbaum; Doug MacLean

(57) ABSTRACT

A method is disclosed for adaptively updating full or partial singular value decomposition (SVD) of a transfer matrix. The method employs orthogonal projections of known output and input vectors onto initial estimates of left and right singular vectors to compute corrections to the initial estimates of the singular vectors and singular values and adaptively generate updated estimates thereof. The method can be used for MIMO systems, including system of wireless MIMO communications employing adaptive transmitter and V-BLAST techniques.

20 Claims, 2 Drawing Sheets

OTHER PUBLICATIONS

"Two Decades of Array Signal Processing Research, IEEE Signal Processing Magazine", Krim et al, IEEE Signal Processing Mag., vol. 13, pp. 67-94, Jul. 1996.

"Detection algorithm and initial laboratory results using V-BLAST space-time communication Architecture", Golden et al, Elec. Lett., vol. 35, Jan. 1999.

"A new efficient subspace tracking algorithm based on singular value decomposition," Kavčić et al, Proc. ICASSP, pp. 485-488, Apr. 1994.

"An adaptive algorithm for V-BLAST", Willink, Proc. Fall Vehicular Technology, Conf., (Los Angeles, CA, USA), Sep. 2004.

"Feedback assisted transmission subspace tracking for MIMO systems," Banister et al, IEEE Sel. Areas Commun., vol. 21, pp. 452-463, Apr. 2003.

"MIMO OFDM for broadband fixed wireless access," Willink, to be published in IEE Proceedings—Communications, 2005.

* cited by examiner

METHOD FOR UPDATING SINGULAR VALUE DECOMPOSITION OF A TRANSFER MATRIX

CROSS-REFERENCE TO RELATED APPLICATIONS

This application claims priority of U.S. Provisional Patent Application No: 60/534,189 filed Jan. 2, 2004, 2004, entitled "Method for Updating the Full or Partial Singular Value Decomposition of A Matrix Transfer Function Using Sampled Data", which is incorporated herein by reference for all purposes.

FIELD OF THE INVENTION

The present invention relates to determining Singular Value Decomposition (SVD) of a transfer matrix using sampled data; and in particular to a method for updating SVD of a channel transfer matrix in a wireless multi-input multi-output (MIMO) communication system.

BACKGROUND OF THE INVENTION

Singular value decomposition (SVD) of a matrix is a powerful mathematical tool used in many applications involving data processing, including data mining, dynamic system control, and communication systems. In particular, SVD is advantageously used in MIMO systems to determine orthogonal input-output channels over which information can be transmitted independently and without inter-channel interference, or to determine weight vectors and symbol detection order in systems employing successive interference cancellation. In some cases when the matrix in question changes in dependence on a parameter, e.g. time or frequency, the SVD of the matrix has to be repeatedly updated. Since conventional methods of SVD computation can be fairly complex and time-consuming, developing simplified and effective SVD update algorithms is of considerable practical significance.

A wireless MIMO communication system, wherein multiple transmit and receive antennas are used to increase capacity and combat multi-path interference and channel fading during transmission of information, is an important example of an application, which can benefit from efficient SVD update algorithms.

In a typical MIMO communication system having K>1 antennas at a transmit site and M>1 antennas at a receive site, each receive antenna can detect signal energy from each of the K transmit antennas, thereby providing K×M interfering signal paths between the receiver and the transmitter. Signal transmission in this system is commonly described by a matrix equation $$r = Hs + v \quad (1)$$

where s is an input vector of length K with element $s_i$ representing an information signal emitted by the $i^{th}$ transmit antenna, r is an output vector of length M with element $r_i$ representing a signal sample detected by the $i^{th}$ receive antenna, v is a length M noise vector accounting for transmission and receiver noise, and H is a transfer matrix of size M×K accounting for multi-path interference and other linear transmission effects affecting the signal. The transfer matrix H of a MIMO wireless channel can change with time and in dependence on channel frequency.

SVD of the transfer matrix H has the form $$H = V\Sigma U^H. \quad (2)$$

Columns of the unitary matrices $V = [v_1 \ldots v_M]$ and $U = [u_1 \ldots u_K]$ are commonly referred to as left and right singular vectors $v_i$ and $u_i$, respectively, corresponding to singular values $\sigma_i$. The M×K matrix $\Sigma$ has the singular values $\sigma_i$ as its diagonal elements, i.e. $\Sigma_{ii} = \sigma_i$ for $i=1, \ldots, \min(M,K)$, with all other elements equal to zero. The superscript $[\,]^H$ in equation (2) denotes the complex conjugate transpose operation.

The left and right singular vectors form two orthogonal sets of vectors, which define M-dimensional receiver and K-dimensional transmitter spaces, respectively, with M typically equal to or exceeding K. Transmission of a $j^{th}$ right singular vector by the transmitter results in the reception of the $j^{th}$ left singular vector scaled by a gain coefficient equal to the $j^{th}$ singular value $\sigma_j$ and some additive noise:

$$s = u_j \Rightarrow r = \sigma_j v_j + v_j. \quad (3)$$

Therefore, knowledge of the SVD of the transfer matrix enables the establishment of up to K orthogonal independent communication channels between the receiver and the transmitter, and the deciphering of the transmitted signal at the receiver site. If the transfer matrix changes with time, or e.g. with frequency, the SVD needs to be periodically updated to maintain channel orthogonality and avoid inter-channel interference.

U.S. Pat. No. 6,760,388 issued to Ketchum, et al. discloses a wireless MIMO system employing the SVD at the transmitter to determine eigen-modes, i.e., spatial subchannels, of the MIMO channel and to derive a first set of steering vectors used to "precondition" modulation symbols. The SVD is also performed at the receiver to derive a second set of steering vectors used to precondition the received signals, such that orthogonal symbol streams are recovered at the receiver. The MIMO system taught by Ketchum, as well as some other prior art MIMO systems employ conventional algorithms of SVD processing. These algorithms typically require computation of the full SVD and have complexity of at least $O(M^3)$, i.e. the number of multiplications they require grows as $M^3$ as M increases, which may not be feasible for real-time implementation in applications requiring frequent updates when M is large.

In many applications, the MIMO channel and the corresponding transfer matrix changes slowly, so that the sets of the singular vectors do not change much between consecutive updates. Therefore, instead of performing a full SVD computation each time an SVD update is required, tracking techniques may be employed when the singular vectors and singular values at an $n^{th}$ step are found using known singular values and singular vectors determined at the $(n-1)^{th}$ step. In many cases, for example when some of the singular values are too small for reliable detection, only a subset of the singular vectors and singular values needs to be updated; such periodic updating of a subset of the singular vectors is sometimes referred to in the art as subspace tracking.

However, most prior-art subspace tracking techniques are based on eigenvalue decomposition (EVD), wherein only the left singular vectors $v_j$, which are the eigenvectors of a covariance matrix $R = E\{rr^H\}$, where $E\{\}$ denotes math expectation, and its eigenvalues $\square_j = \sigma_j^2$ are computed. Estimates of the right singular vectors can be then obtained by inverting the SVD equation (2) requiring again a matrix multiplication of complexity $O(M^3)$. A summary of the subspace tracking techniques is given in H. Krim and M. Viberg, in an article entitled "Two decades of array signal processing research," IEEE Signal Processing Mag., vol. 13, pp. 67-94, July 1996.

A method for updating the right singular vectors and eigenvalues, i.e., the eigendecomposition of $R_r = H^H H + \omega_n^2 I$, was disclosed in an article by A. Kavčić and B. Yang entitled "A new efficient subspace tracking algorithm based on singular value decomposition," Proc. ICASSP, pp. 485-488, April 1994. However, the Kavčić method does not provide the left singular vectors, which again can be computed from equation (2) requiring a matrix multiplication of complexity $O(K^3)$, which can be unacceptable for applications requiring frequent updates.

B. Banister and J. Zeidler, in an article entitled "Feedback assisted transmission subspace tracking for MIMO systems," IEEE Sel. Areas Commun., vol. 21, pp. 452-463, May 2003, disclosed an adaptive algorithm for use in MIMO wireless communication systems, wherein weight arrays are used at the transmitter and the receiver for establishing the orthogonal communications channels. The weight arrays are periodically jointly updated to adapt to changing transmission conditions. The Banister method requires computation of a binary feedback decision, which is used to increment or decrement the transmitter weight array. Furthermore, this method has an advantage of low feedback throughput requirements, at the cost of complexity at the transmitter and receiver; it requires at least one matrix multiplication at the receiver, as well as one matrix addition and a Gram-Schmidt orthogonalization at the transmitter, and has the complexity of at least $O(M^3)$.

An alternative MIMO transmission techniques commonly referred to as V-BLAST uses a cancellation and nulling scheme requiring multiple instances of Moore-Penrose pseudo-inverses of a modified channel matrix $H^+$ also requiring SVD computations:

$$H^+ = U\bar{\Sigma}V^H \qquad (4)$$

where the elements of $\bar{\Sigma}$ are given by $$\bar{\sigma}_i = \begin{cases} 1/\sigma_i & \text{if } \sigma_i > 0 \\ 0 & \text{otherwise.} \end{cases} \qquad (5)$$

This approach is described e.g. in an article by G. Golden, G. Foschini, R. Valenzuela, and P. Wolniansky, entitled "Detection algorithm and initial laboratory results using VBLAST space-time communication architecture," Elect. Lett., vol. 35, January 1999, and is also taught in U.S. Pat. No. 6,763,073 issued to G. J. Foschini and G. D. Golden. In a time-varying application, this approach would also benefit from a low-complexity SVD update method applied to update the matrix inverses as $H^+$ changes.

It would be therefore advantageous for a number of applications to have a low-complexity method of updating the SVD of a slowly-varying or fixed transfer matrix.

An object of this invention is therefore to provide such a low-complexity method of updating left and right singular vectors and singular values of an SVD of slowly-varying or fixed transfer matrices using known information of input and output vectors.

It is another object of this invention to provide a low-complexity method of partial SVD updating for slowly-varying or fixed transfer matrices, wherein only some left and right singular vector pairs are updated together with their corresponding singular values.

SUMMARY OF THE INVENTION

In accordance with the invention, a method is provided for updating singular values and singular vectors in a singular value decomposition (SVD) of a matrix transfer function relating an output vector to an input vector, the method comprising the steps of: a) obtaining initial estimates of the singular values and singular vectors; b) providing the output vector and the input vector; c) projecting the output vector and the input vector onto the initial estimates of the singular vectors to obtain orthogonal projections of the output and input vectors; and, d) determining updated estimates of the singular values and singular vectors from the orthogonal projections of the input and output vectors and the initial estimates of the singular values and the singular vectors.

In accordance with one aspect of this invention, the method is for updating a subset of a full set of singular vectors, the subset comprising p left singular vectors and p right singular vectors, wherein p is an integer that is equal or less than min(M,K), wherein both K and M are integers and wherein K is a dimension of the input vector, and M is a dimension of the output vector.

In accordance with another aspect of this invention, the step of determining updated estimates of the singular values and singular vectors comprises the steps of computing an orthogonal correction vector for each singular vector, and adding the orthogonal correction vector to the initial estimate of a corresponding singular vector.

In accordance with another aspect of this invention, the step of computing an orthogonal correction vector for each singular vector further comprises the step of computing (p−1) orthogonal expansion coefficients for each singular vector from the orthogonal projections of the output and input vectors onto initial estimates of the right and left singular vectors using the initial estimates of the singular values.

In accordance with another aspect of this invention, the step of computing an orthogonal correction vector for each singular vector comprises the steps of recursively computing an orthogonal correction vector for each of the p left singular vectors and recursively computing an orthogonal correction vector for each of the p right singular vectors using the orthogonal projections of the output and input vectors onto initial estimates of the right and left singular vectors and the initial estimates of the singular values.

In accordance with another aspect of the invention, a method is provided for adaptive signal processing in multiple-input multiple-output communication systems comprising the steps of: a) transmitting information signal in multiple signal streams with a multiple-output transmitter; b) sampling multiple data streams received by a multiple-input receiver to form an output vector; c) obtaining an input vector related to the output vector and to a transfer matrix; d) obtaining initial estimates of left singular vectors, right singular vectors and singular values of a singular-value decomposition of the transfer matrix, e) determining updated estimates of the left singular vectors, right singular vectors and the singular values using the initial estimates thereof and projections of the input and output vectors on the initial estimates of the right and left singular vectors; f) using the updated estimates of the left and right singular vectors and the singular values for adaptively extracting the information signal from the multiple signal streams received by the receiver and/or for adaptively emitting the information signal in multiple signal streams by the transmitter.

BRIEF DESCRIPTION OF THE DRAWINGS

Exemplary embodiments of the invention will now be described in conjunction with the drawings in which.

DETAILED DESCRIPTION

Figure 1:
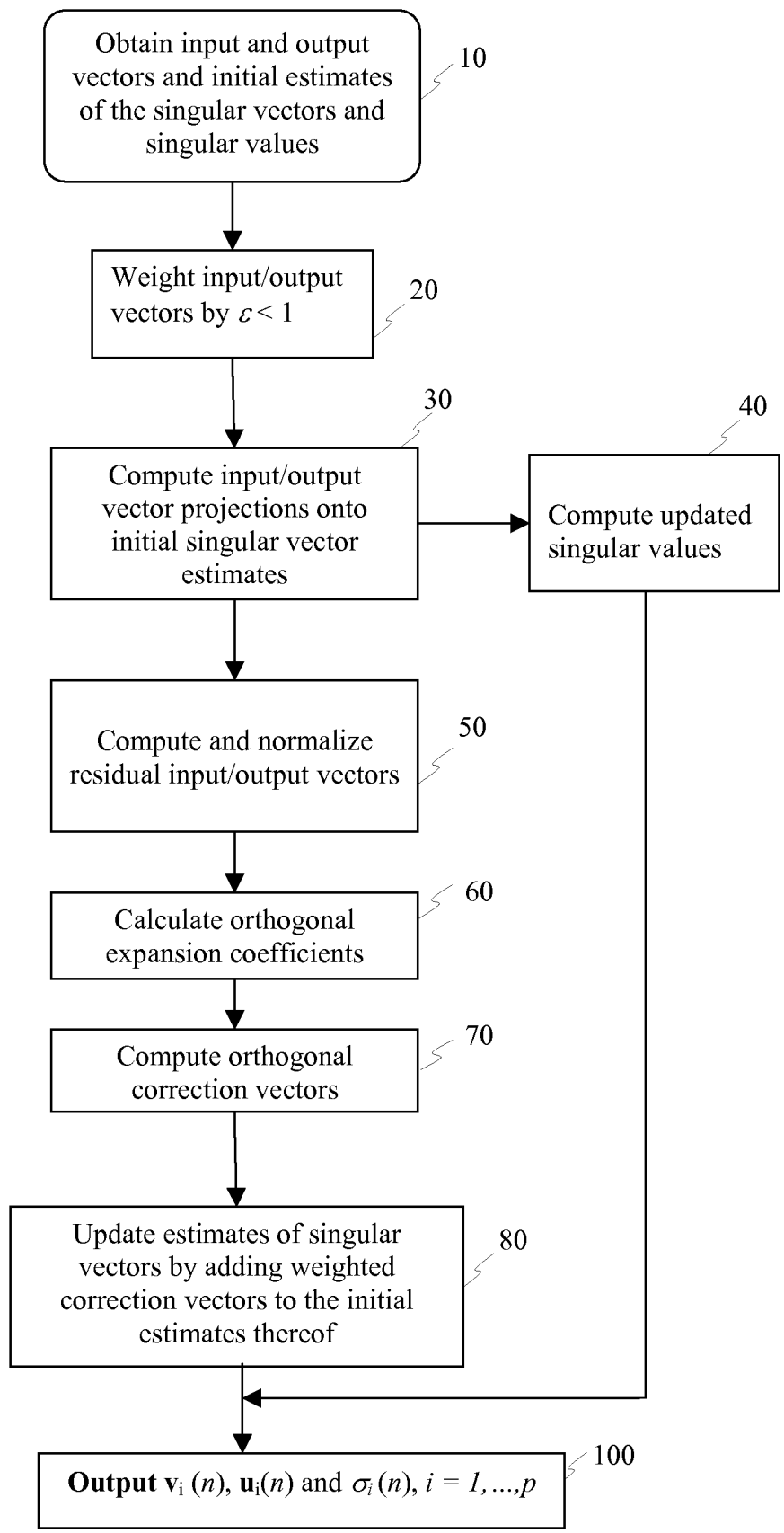
FIG. 1 is a flowchart of an SVD updating algorithm using orthogonal expansion coefficients.

The present invention provides a recursive, low complexity method for adaptively estimating some or all of the left and right singular vectors and the corresponding singular values of a transfer matrix H. Neither the transfer matrix H, which relates an input, or signal, vector s to an output, or received vector r in accordance with equation (1), nor its SVD defined by equation (2) are explicitly computed. Instead, the method uses the received vector r and the signal vector s or its estimate to update initial estimates of a) the left and right singular vectors, and b) the corresponding singular values, and to output the updated estimates thereof; the initial estimates are provided to the method as an input or are otherwise known.

The method can be applied to any system that can be described by the linear matrix equation (1) with a transfer matrix H that is either constant or varies in dependence on time or some other parameter, e.g. a transmission frequency if the system of interest is a communication system with frequency multiplexing. An application of the method of the present invention in a V-BLAST MIMO system is described by the inventor of this invention in an article "An adaptive algorithm for V-BLAST," Proc. Fall Vehicular Technology, Conf., (Los Angeles, Calif., USA), September 2004, which is incorporated herein by reference.

The method is recursive, i.e. the updated estimates of the singular vectors and singular values obtained from one execution of the method can be used as the initial estimates thereof at a next execution of the method. In some instances, for example for a first execution of the method, the initial estimates of the singular vectors and the corresponding singular values can be obtained in some other way; for example, a first execution of the method can start with the initial estimates provided externally, or chosen in accordance with some other algorithm, e.g. arbitrarily.

An integer index n, also referred to as an update sample, will be used hereinafter to mark successive executions of the method; for systems wherein the transfer matrix depends e.g. on time or frequency, n can represent a time or a frequency sample.

With this notation, equation (1) becomes $$r(n)=H(n)s(n)+v(n), \qquad (6)$$

wherein the input vector s(n) of size K, the noise vector υ(n) of size M and the output vector r(n) of size M depend on the update sample n, wherein both M and K are integers.

To acknowledge a possible dependence of the transfer matrix H on the update sample n, the transfer matrix will be hereinafter also referred to as a transfer matrix function H(n). However, the method can be advantageously applied to systems with constant transfer matrices, in which case it can be used for iterative partial or full SVD computations, for example.

By way of example, in a wireless MIMO transmission the transfer matrix may change in time due to a changing transmission environment if the receivers and/or transmitters are mobile, or due to weather-related effects. Moreover, wireless MIMO transmissions may be sub-channel frequency dependent in frequency-multiplexed systems, as described e.g. by the inventor of the present invention in an article entitled "MIMO OFDM for broadband fixed wireless access," T. Willink, to be published in IEE Proceedings Communications, 2005, which is incorporated herein by reference.

Before providing detailed descriptions of particular exemplary embodiments of the method of the present invention, its mathematical foundations will now be described.

The M left singular vectors and the K right singular vectors form, respectively, the M×M left unitary matrix $V(n)=[v_1(n) \ldots v_M(n)]$ and the K×K right unitary matrix $U(n)=[u_1(n) \ldots u_K(n)]$ of the SVD decomposition of the matrix H(n) as defined by $$H(n)=V(n)\Sigma(n)U(n)^H \qquad (7)$$

wherein the M×K diagonal matrix of singular values Σ(n) is defined by its diagonal elements $\Sigma_{ii}(n)=\sigma_i(n)$ with the singular values $\sigma_i(n)$ dependent on the update sample n.

Note that there is at most N=min(K,M) non-zero singular values $\sigma_i(n)$, i=1, 2, . . . , N, in the SVD decomposition of H, each of which is associated with a pair of left and right singular vectors $(v_i, u_i)$ as described by equation (3). It is therefore enough to track at most N dimensions of the transmitter and receiver spaces, i.e. at most N one-dimensional sets of SVD components $(v_i, u_i, \sigma_i)$; the full set of the SVD components is denoted hereinafter as $\{v_i, u_i, \sigma_i\}_N$.

The method of this invention provides an additional flexibility of tracking of an arbitrary number of dimensions p, i.e. p left and right singular vector pairs $v_i(n)$, $u_i(n)$ and p singular values $\sigma_i(n)$, wherein p is an integer that can be equal or smaller than rank(H(n)), wherein rank(H(n)) denotes a rank of the transfer matrix H(n) which is equal or smaller than N=min (K,M). Left and/or right singular vectors corresponding to zero singular values can be selected arbitrarily to span spaces orthogonal to those spanned by the respective singular vectors with non-zero singular values.

The subsets $\{v_i, i=1, \ldots, p\}$ and $\{u_i, i=1, \ldots, p\}$ of p left singular vectors and p right singular vectors tracked by the method form orthogonal bases of subspaces in the receiver and transmitter spaces, which are referred to hereinafter in this specification as left and right signal subspaces respectively. For clarity the singular vectors $v_i$ and $u_i$ are assumed hereinafter to be ordered in such a way that the p left and p right singular vectors tracked by the method correspond to i=1, . . . , p, while the rest of the left and right singular vectors correspond to i=p+1, . . . , K and i=p+1, . . . , M respectively.

The method is based on a following implicit recursive update of an estimate of the transfer matrix:

$$\hat{H}(n)=\alpha\hat{H}(n-1)+(1-\alpha)r(n)s^H(n), \qquad (8)$$

where α is a 'forgetting factor', also referred to hereinafter as a first weighting factor; it may be selected depending on a particular application. An objective of the method of the present invention is to obtain estimates of some or all of the left and right singular vectors, $v_i(n)$ and $u_i(n)$, respectively, and singular values, $\sigma_i(n)$, of H(n) using a series of input vectors s(n), or their estimates $\hat{s}(n)$, and the corresponding output vectors r(n), such that $$\hat{V}(n)\hat{\Sigma}(n)\hat{U}^H(n) \approx \hat{H}(n) \qquad (9)$$

In equations (8) and (9) a symbol "^" above a parameter denotes an estimate thereof; since the method operates exclusively with-estimates of the SVD components while actual values are unknown, in the description following hereinafter the symbol "^" will be omitted whenever it cannot cause a confusion.

According to the present invention, the estimate Ĥ(n) of the transfer matrix is not computed explicitly. Instead, at each update sample n, updated estimates $v_i(n)$, $u_i(n)$ and $\sigma_i(n)$ of the left and right singular vectors and of the singular values are computed as small perturbations of the previous estimates $v_i(n-1)$, $u_i(n-1)$ and $\sigma_i(n-1)$, also referred to herein as initial estimates.

Using known approaches of matrix perturbation theory, we obtained a following set of equations for the updated estimates $v_i(n)$, $u_i(n)$ and $\sigma_i(n)$:

$$\sigma_i(n) = \alpha\sigma_i(n-1) + \varepsilon\mathcal{R}\{v_i^H(n-1)r(n)s^H(n)u_i(n-1)\}\ i=1,\ldots,N \quad (10)$$

$$v_i(n) = v_i(n-1) + \varepsilon\sum_{j=1}^{M} a_{ji}v_j(n-1)\ i=1,\ldots,M \quad (11a)$$

$$u_i(n) = u_i(n-1) + \varepsilon\sum_{j=1}^{K} b_{ji}u_j(n-1)\ i=1,\ldots,K \quad (11b)$$

Symbol $\mathcal{R}\{\ \}$ in equation (10) denotes a real part of a complex expression in the brackets $\{\}$. Parameter $\varepsilon=1-\alpha$ and is referred to hereinafter in this specification as a second weighting factor.

Orthogonal expansion parameters $a_{ij}$ and $b_{ij}$ satisfy the following equations (12) and (13):

$$a_{ji} = \begin{cases} \frac{1}{(\sigma_i^2(n-1)-\sigma_j^2(n-1))}(\sigma_j(n-1)u_j^H(n-1)s(n)r^H(n)v_i(n-1) + \sigma_i(n-1)v_j^H(n-1)r(n)s^H(n)u_i(n-1)),\ i<j \\ -a_{ij}^*,\ i>j \\ 0,\ i=j \end{cases} \quad (12)$$

and $$b_{ji} = \begin{cases} \frac{1}{(\sigma_i^2(n-1)-\sigma_j^2(n-1))}(\sigma_j(n-1)v_j^H(n-1)r(n)s^H(n)u_i(n-1) + \sigma_i(n-1)u_j^H(n-1)s(n)r^H(n)v_i(n-1)),\ i<j \\ -b_{ij}^*,\ i>j \\ 0,\ i=j \end{cases} \quad (13)$$

Equations (10)-(13) enable construction of efficient algorithms for updating the left and right singular vectors and the corresponding singular values, and form a basis of the method of present invention; two such algorithms will now be discussed in sufficient detail.

According to the method of the present invention, each of the updated estimates $v_i(n)$ and $u_i(n)$ of $i^{th}$ left and right singular vectors is computed as a sum of the initial estimate thereof and a small correction vector orthogonal thereto. More specifically, equations (11a) give the updated estimate $v_i(n)$ of an $i^{th}$ left singular vector as a sum of the previous estimate thereof $v_i(n-1)$ and a left correction vector $\varepsilon L_i(n)$ given as a vector expansion over the initial estimates of the other (M−1) left singular vectors, with the expansion coefficients $a_{ij}$ determined by projections $u_i^H(n-1)s(n)$ and $v_i^H(n-1)r(n)$ of the input and output vectors $s(n)$ and $r(n)$ onto the full sets of the initial estimates of the right and left singular vectors respectively:

$$L_i(n) = \sum_{j=1}^{M} a_{ji}v_j(n-1). \quad (14)$$

Similarly, equations (11b) give the updated estimate of an $i^{th}$ right singular vector $u_i$ as a sum of the previous, $(n-1)^{th}$, estimate thereof, and an orthogonal thereto right correction vector $\varepsilon R_i(n)$, wherein $$R_i(n) = \sum_{j=1}^{K} b_{ji}u_j(n-1) \quad (15)$$

given as a vector expansion over the initial estimates of the other (K−1) right singular vectors, with expansion coefficients $b_{ij}$ again determined by the orthogonal projections of the input and output vectors $u_i^H(n-1)s(n)$ and $v_i^H(n-1)r(n)$.

When only a subset of the SVD components is being tracked, i.e. if p<N, the initial estimates of the left singular vectors $v_i(n-1)$ for i=p+1,..., K and the initial estimates for the right singular vectors $u_i(n-1)$ for i=p+1,..., M are not available. These missing initial estimates of the left and right singular vectors may be substituted in equations (11)-(15) by unit vectors $\bar{v}_{p+1}$ and $\bar{u}_{p+1}$ directed along vector projections of the output and input vectors $r(n)$ and $s(n)$ onto subspaces of the receiver and transmitter spaces which are orthogonal respectively to the left and right signal subspaces, i.e. along the vectors $$\bar{r} = r(n) - \sum_{j=1}^{p} v_j(n-1)v_j^H(n-1)r(n) \quad (16a)$$

$$\bar{s} = s(n) - \sum_{j=1}^{p} u_j(n-1)u_j^H(n-1)s(n) \quad (16b)$$

Vectors $\bar{s}$ and $\bar{r}$ defined by equations (16a,b) are hereinafter referred to as a residual input vector and a residual output vector respectively.

Each of the left or right orthogonal correction vectors is then computed as a vector expansion in p-dimensional subspaces over an orthogonal base formed by a) previous estimates of the other (p−1) left or right tracked singular vectors, and b) a unit vector in the direction of the residual output or input vector respectively defined by equations (16a,b).

More specifically, if p<N the SVD components are updated according to the following equations $$\sigma_i(n) = \begin{cases} \alpha\sigma_i(n-1) + \varepsilon\mathcal{R}\{v_i^H(n-1)r(n)s^H(n)u_i(n-1)\}, i=1,\ldots,p \\ \alpha\sigma_i(n-1) + \varepsilon\|\bar{r}\|\|\bar{s}\|, i = p+1 \end{cases} \quad (17a)$$

$$v_i(n) = v_i(n-1) + \varepsilon\left(\sum_{j=1}^{p} a_{ji}v_j(n-1) + a_{(p+1)i}\bar{v}_{p+1}\right) \quad (17b)$$

$$u_i(n) = u_i(n-1) + \varepsilon\left(\sum_{j=1}^{p} b_{ji}u_j(n-1) + b_{(p+1)i}\bar{u}_{p+1}\right) \quad (17c)$$

The unit vectors $\bar{v}_{p+1}$ and $\bar{u}_{p+1}$ in equations (17b,c) are respectively normalized residual vectors $\bar{r}$ and $\bar{s}$, i.e. vectors of unit length in the directions of the residual vectors; $\|.\|$ in equation (17a) means a norm of a vector. The orthogonal expansion parameters $a_{(p+1)i}$ and $b_{(p+1)i}$, i=1, . . . , p, can be computed from equations (12) and (13) using $v_{p+1}(n-1)=\bar{v}_{p+1}$ and $u_{p+1}(n-1)=\bar{u}_{p+1}$.

If p=N and M≠K, only one of the two residual vectors needs to be computed; for example, if p=K<M, only the output residual vector $\bar{r}$ is non-zero; its corresponding orthogonal expansion coefficient $a_{N+1,i}$ can be determined as $$a_{N+1,i} = \frac{y_{N+1}x_i^*}{\sigma_i(n-1)}, \quad (18)$$

where $x_i = u_i^H(n-1)s(n)$ and $y_i = v_i^H(n-1)r(n)$ are the projections of the input and output vectors on the right and left i-th singular vectors respectively.

If p=M<K, the input residual vector $\bar{s}$ and its corresponding orthogonal expansion coefficient $b_{N+1,i}$ can be computed in a similar way.

Equations (12), (13) together with equations (16a)-(17c) form a basis of a first exemplary embodiment of the method according to the present invention. An SVD update algorithm implementing these equations for updating simultaneously the left and right singular vectors and the corresponding singular values has a complexity of $O((M+K)\times p)$. This is significantly lower than the complexity of the prior-art algorithms for tracking both the left and right singular vectors.

The updated singular vectors $u_i(n)$ and $v_i(n)$ may be used as new initial estimates in a next, $(n+1)^{th}$ execution of the algorithm, and so on, enabling thereby continuous adapting of the SVD components to changing conditions, a process which is commonly referred to as subspace tracking. Note that equations (12), (13) and (16a)-(17c) do not guarantee that the updated left or right singular vectors are of a unit norm and orthogonal to each other, therefore periodic ortho-normalization, i.e. normalization to a unit length and orthogonalization thereof may be required; this can be performed using conventional algorithms such as e.g. a Gram-Schmidt orthogonalization.

Additionally, consecutive application of the method can lead to accumulation of phase errors in the singular vector estimates. Note that "true" singular vectors $v_i$ and $u_i$ satisfy the following condition $$v_i^H r = \sigma_i u_i^H s \quad (19)$$

If the estimates $\hat{v}_i$, $\hat{u}_i$ of the true left and right $i^{th}$ singular vectors $v_i$, $u_i$ have phase offsets of, respectively, $\phi_i$ and $\theta_i$ relative to corresponding true singular vectors, i.e. $\hat{u}_i = e^{j\theta_i}u_i$ and $\hat{v}_i = e^{j\phi_i}v_i$, a corresponding estimate of the transfer matrix function $\hat{H}$ is $$\hat{H} = \sum_i \hat{\sigma}_i \hat{v}_i \hat{u}_i^H = \sum_i \hat{\sigma}_i v_i u_i^H e^{j(\phi_i - \theta_i)}.$$

and condition (19) is not satisfied. Therefore, it may be necessary to incorporate phase-tracking into the aforedescribed subspace-tracking algorithm. This phase tracking can be accomplished for example using an algorithm that minimizes an error function w $$w = (\hat{u}_i^H(n-1)s(n) - z_i(n-1)\hat{v}_i^H(n-1)r(n))$$

wherein $z_i$ is a complex phase correction variable.

A low complexity SVD update algorithm according to the present invention which provides an option of correcting the phase with an update factor $\mu$ is given in APPENDIX hereinbelow.

By way of example, the method of phase-tracking described in the APPENDIX determines the phase correction parameter $z_i$ (n−1) by minimizing the error function w using a least-mean squares (LMS) filtering, and then updates the phase correction variable according to $z_i(n) = z_i(n-1) + \mu w^* \hat{v}_i^H(n-1)r(n)$. The relative phase error $(\phi_i - \theta_i)$ is then corrected using a substitution $\hat{v}_i(n) \leftarrow z_i(n)\hat{v}_i(n)$, and the phase of $z_i(n)$ is set to zero for a next recursion. Alternative phase tracking algorithms are of course possible; for example, only the phase and not the magnitude of the variable $z_i$ can be tracked, or other linear adaptive filters can be used instead of the LMS.

Computational complexity of the SVD update method of the present invention is further reduced if the orthogonal expansion coefficients for i<j are chosen to satisfy the following simplified set of equations (20):

$$a_{ji} \approx y_j x_i^* / \sigma_i(n-1) \text{ and } b_{ji} \approx x_j y_i^* / \sigma_i(n-1) \quad (20)$$

This approximation for the orthogonal expansion coefficients $a_{ij}$, $b_{ij}$ can be obtained from equations (12), (13) assuming that the SVD parameter sets $(u_i, v_i, \sigma_i)$, i=1, . . . , p are ordered so that $\sigma_1 \geq \sigma_2 \geq \ldots \geq \sigma_p$, and all the singular values are sufficiently dissimilar; we found however that the method described hereinbelow may work well even if these assumptions are not met.

We will now show that, if the orthogonal expansion coefficients satisfy equations (20), the orthogonal correction vectors for each singular vector can be computed recursively, i.e. by computing an orthogonal correction vector for an $i^{th}$ singular vector using a previously calculated orthogonal correction vector for a corresponding $(i-1)^{th}$ singular vector, and thereby reducing the number of orthogonal expansion coefficients which have to be calculated for each singular vector to 2.

In particular, using equations (14), (15) and (20), the orthogonal correction vectors can be re-written in a form specified by the following equations:

$$L_i(n) = \frac{x_i^*}{\sigma_i(n-1)} f_i^v - y_i^* g_i^v \quad (21)$$

and

-continued $$R_i(n) = \frac{y_i^*}{\sigma_i(n-1)} f_i^u - x_i^* g_i^u \quad (22)$$

Parameters $f_i^v$ and $f_i^u$ are vector projections of the output and input vectors onto subspaces defined respectively by the singular vector sets $\{v_j(n-1), j=i+1, \ldots, M\}$ and $\{u_j(n-1), j=i+1, \ldots, K\}$:

$$f_i^v = \sum_{j=i+1}^{M} y_j v_j(n-1), i = 1, \ldots, M-1$$

$$f_i^u = \sum_{j=i+1}^{K} x_j u_j(n-1), i = 1, \ldots, K-1$$

and $g_i^v$ and $g_i^u$ are weighted projections of the input and output vectors onto subspaces defined by the singular vector sets $\{v_j(n-1), j=1, \ldots, i-1\}$ and $\{u_j(n-1), j=1, \ldots, i-1\}$:

$$g_{i+1}^v = \sum_{j=1}^{i} \frac{x_j}{\sigma_j(n-1)} v_j(n-1) \quad i = 1, \ldots, M-1$$

$$g_{i+1}^u = \sum_{j=1}^{i} \frac{y_j}{\sigma_j(n-1)} u_j(n-1) \quad i = 1, \ldots, K-1$$

The projections $f_i^v$, $g_i^v$ can be calculated recursively using the following set of equations for $i=1, \ldots, M-1$:

$$f_i^v = f_{i-1}^v - y_i v_i(n-1) \quad (23)$$

$$g_{i+1}^v = g_i^v + \frac{x_i}{\sigma_i(n-1)} v_i(n-1) \quad (24)$$

and following boundary conditions $$f_0^v = r(n); g_1^v = 0. \quad (25)$$

Similarly, the projections $f_i^u$, $g_i^u$ can be calculated recursively using the following set of equations for $i=1, \ldots, K-1$:

$$f_i^u = f_{i-1}^u - x_i u_i(n-1) \quad (26)$$

$$g_{i+1}^u = g_i^u + \frac{y_i}{\sigma_i(n-1)} u_i(n-1) \quad (27)$$

with boundary conditions $$f_0^u = s(n), g_1^u = 0. \quad (28)$$

Using equations (21)-(28), the left and right correction vectors $L_i(n)$, $R_i(n)$ can be calculated recursively starting with $i=1$ and used to compute the updated right and left singular vectors according to $$v_i(n) = v_i(n-1) + \epsilon L_i(n) \quad (29)$$

$$u_i(n) = u_i(n-1) + \epsilon R_i(n) \quad (30)$$

Equations (21)-(30) together with equation (10) form a basis of a second exemplary embodiment of the method according to the present invention.

The aforedescribed method can be applied to any situation in which a sample-by-sample update of the SVD of an unknown matrix transfer function is required. The matrix transfer function may be static or slowly varying with respect to the update rate.

DESCRIPTION OF THE PREFERRED EMBODIMENTS

Exemplary embodiments of the method for updating singular vectors and singular values of a transfer matrix function will now be described in reference to FIGS. 1 and 2.

By way of example, the description hereinbelow refers to a MIMO communication system having a K-element transmitter array, an M-element receiver array, and a time-dependent transfer matrix function $H(n)=H\{t_n\}$ relating the transmit and receive signals; signals from each of the M elements of the receiver array are sampled at time instances $t_n$, with $n=0, 1, 2 \ldots$ being the update sample, and $t_{n-1} < t_n$, to form at each time instance $t_n$ an M-dimensional vector of the received samples, or the output vector $r(n)$ which is related to a K-dimensional transmitted vector $s(n)$, also referred to hereinbefore as the input vector, according to equation (6).

The method is preferably implemented at the receiver site using suitably programmed digital signal processors. It can be used for adapting the transmitter array and the receiver array structures for transmission of multiple signal streams, wherein periodically updated right singular vectors and left singular vectors are used as weight arrays at the transmitter and the receiver, e.g. according to equation (19), for establishing orthogonal communications channels, as taught for example by B. Banister and J. Zeidler, in an article entitled "Feedback assisted transmission subspace tracking for MIMO systems," IEEE Sel. Areas Commun., vol. 21, pp. 452-463, May 2003, or by the inventor of the present invention in an article entitled "MIMO OFDM for broadband fixed wireless access," T. Willink, to be published in IEE Proceedings—Communications, 2005, which is incorporated herein by reference. More generally, the method of the present invention can be used for adapting the transmitter and receiver structures for establishing orthogonal communications channels using diversity derived from space, time, frequency, polarization or other domain, or combinations thereof. In other embodiments, the method can be used in MIMO systems for adaptive processing of a vector of the received data samples, i.e. the output vector, using SVD update for vector cancellation and nulling schemes, such as V-BLAST.

The embodiments described herein update the first p left and p right singular vectors and the corresponding p singular values of the transfer matrix $H(n)$, where $p \leq N = \min(M,K)$. The method can easily be adapted for updating of p arbitrarily ordered singular vector pairs.

FIG. 1 schematically shows main steps of the method according to a first exemplary embodiment thereof in reference to its $n^{th}$ execution.

In a first step 10, the output vector $r(n)$, the input vector $s(n)$ and initial estimates of the singular vectors $v_i(n-1)$ and $u_i(n-1)$ and the corresponding singular values $\sigma_i(n-1)$, $i=1, \ldots, p$, are provided. While the output vector $r(n)$ can normally be obtained from the MIMO receiver array, the input or transmitted vector $s(n)$ can be for example a training signal known to the receiver, or it can be estimated by an alternative method. The initial estimates of the singular vectors and the singular values to be updated are preferably obtained from a previous (n−1)$^{th}$ execution of the method. For a first execution of the method, i.e. n=1, the initial estimates of $u_i$, $v_i$ and $\sigma_i$ may be selected arbitrarily, such that $$u_i^H(0)u_j(0) = v_i^H(0)v_j(0) = \begin{cases} 1 & \text{if } i = j \\ 0 & \text{otherwise} \end{cases}$$

Suitable initial estimates for n=1 are $$U(0)=[u_1(0) \ldots u_K(0)]=I_K, \; V(0)=[v_1(0) \ldots v_M(0)]=I_M$$
$$\text{and } \sigma_i \in (0,1) \, i=1,\ldots,p.$$

where $I_K$ and $I_M$ are diagonal unitary matrices of size K and M.

In a next step 20, the input and output vectors are multiplied by a small weighting factor $\epsilon \ll 1$:

$$r(n)=\sqrt{\epsilon}r(n)$$

$$s(n)=\sqrt{\epsilon}s(n)$$

$\epsilon=0.01$ was found to provide good algorithm performance in our experiments. In other embodiments, this step may be substituted by e.g. an appropriate scaling of the orthogonal correction vectors at a further step of the method as described by equations (29), (30).

In a next step 30, the output vector r(n) and the input vector s(n) are projected onto the provided initial estimates of the singular vectors to obtain the orthogonal projections of the output and input vectors $x_i$ and $y_i$, i=1, ..., p:

$$x_i=u_i^H(n-1)s(n)$$

$$y_i=v_i^H(n-1)r(n)$$

Next, in a step 40 the updated estimates of the singular values $\sigma_i$, i=1, ..., p, can be determined from the orthogonal projections of the input and output vectors and the initial estimates of the singular values and the singular vectors; alternatively, this step can be combined with a further step 60 of determining the updated singular vectors:

$$\sigma_i(n)=\alpha\sigma_i(n-1)+\Re\{y_i x_i^*\} \quad (31)$$

In a next step 50, if p is less than either M or K or both, the residual input and output vectors $\bar{s}$, $\bar{r}$ are computed by projecting the input and output vectors s, r onto the subspaces orthogonal to the right and left signal subspaces respectively:

$$\bar{s} = s(n) - \sum_{j=1}^{p} x_j u_j(n-1)$$

$$\bar{r} = r(n) - \sum_{j=1}^{p} y_j v_j(n-1)$$

These residual vectors are then normalized by their lengths $x_{p+1}=\|\bar{s}\|$ and $y_{p+1}=\|\bar{r}\|$ to form new orthogonal unit residual vectors $u_{p+1}(n-1)=\bar{s}/x_{p+1}$ and $v_{p+1}(n-1)=\bar{r}/y_{p+1}$. This step is not required if p=M=N, i.e. if a full set of SVD components of a square transfer matrix is updated.

In a next step 60, the orthogonal expansion coefficients $a_{ij}$ and $b_{ij}$ are computed using e.g. equations (12), (13), for ij=1, ..., p. If p is smaller than at least one of M and K, and at least one of the input/output residual vectors was computed in the previous step 50, a corresponding set of the orthogonal expansion coefficients $a_{ij}$ and $b_{ij}$ is computed for the extended (p+1)-dimensional signal subspaces including the corresponding input or output unit residual vector.

Note that the right hand side (RHS) of equations (12), (13) defining $a_{ij}$ and $b_{ij}$ include a difference of singular value estimates in the denominators; this can lead to instability of computations if some of the initial estimates of the singular values are very close to each other. To avoid that, a stabilization function $n_{ij}=\max(\delta\sigma_i^2(n-1), (\sigma_i^2(n-1)-\sigma_j^2(n-1)))$ can be substituted instead of the denominators $(\sigma_i^2(n-1)-\sigma_j^2(n-1))$ in the RHS of equations (12), (13), where $\delta$ is a predetermined stabilization parameter, $0<\delta\leq1$.

This step may include an option of computing phase update parameters for the singular vectors; alternatively, the phases of the singular vectors can be updated in a separate method step. An exemplary phase update algorithm is given in the APPENDIX.

In a next step 70, the orthogonal correction vectors are computed for each of the p left and p right singular vectors using the orthogonal expansion coefficients computed in step 60. For example, if p<K, the left i$^{th}$ correction vector $\epsilon L_i$ is defined by a vector expansion $$\sum_{j=1}^{p} a_{ji}v_j(n-1) + a_{(p+1)i}\bar{v}_{p+1},$$

wherefrom it can be computed.

In a final step 80, the updated estimates $v_i(n)$, $u_i(n)$ of the p left and p right singular vectors are generated by firstly adding the orthogonal correction vectors to the initial estimates of the corresponding singular vectors, as described by e.g. equations (29), (30), and secondly normalizing each of the newly generated singular vectors by their respective lengths. In some embodiments, this step can include a further phase correcting step for at least one of left and right singular vector estimates; exemplary implementations of this step are given in APPENDIX hereinbelow.

The updated and normalized singular vector and singular value estimates $v_i(n)$, $u_i(n)$ and $\sigma_i(n)$, i=1, ..., p, form an output 100 of the method; this output can be used for further processing and decoding of the received signal, and for adaptive adjusting of receiver and/or transmitter array structures, and as the initial estimates in a next execution of the method.

Figure 2:
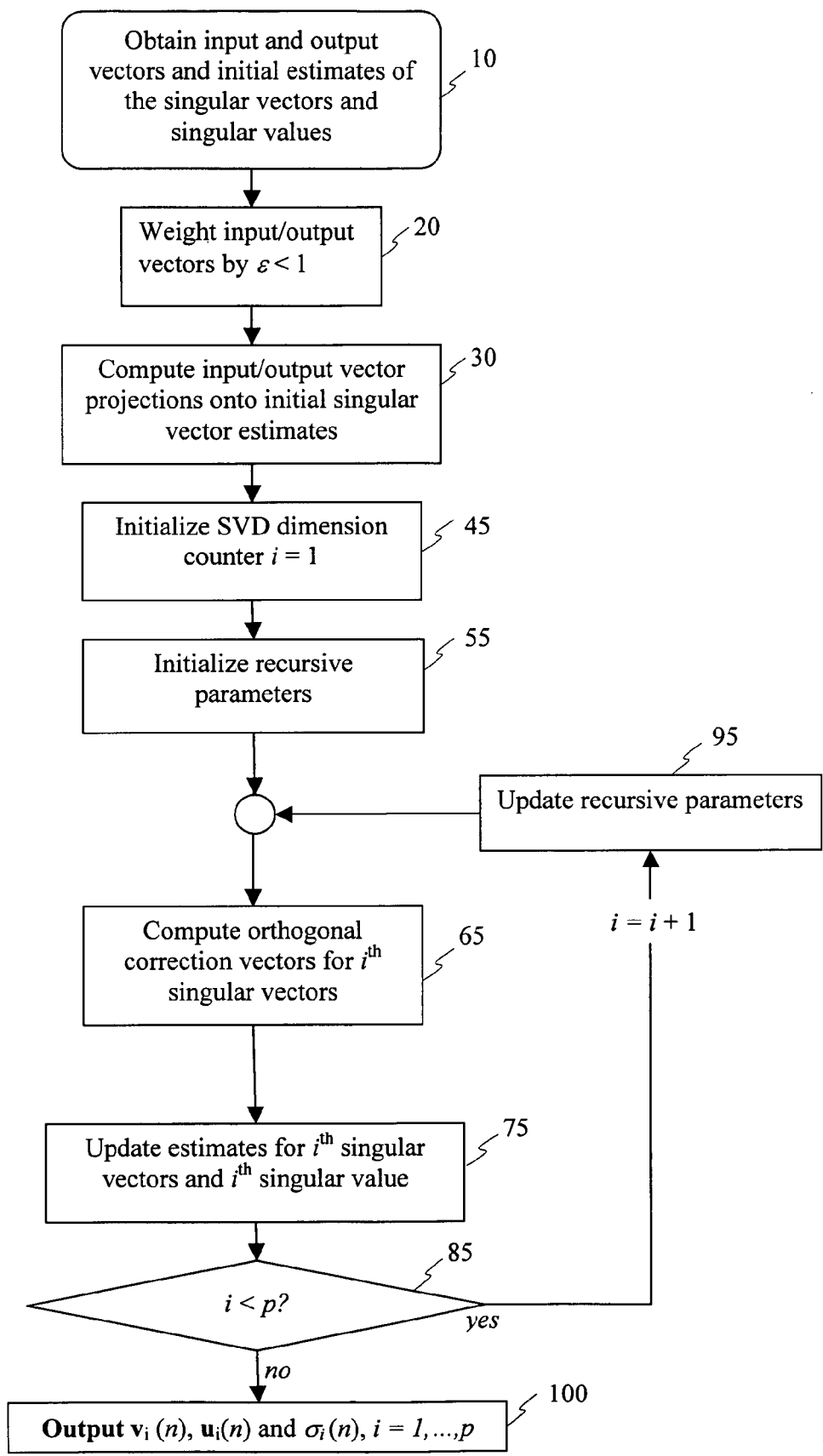
FIG. 2 is a flowchart of a simplified recursive SVD updating algorithm.

FIG. 2 schematically illustrates another embodiment of the method, wherein the orthogonal correction vectors are computed recursively in accordance with equations (23)-(28). The first steps 10, 20 and 30 of this embodiment substantially repeat the first steps 10, 20 and 30 of the aforedescribed embodiment shown in FIG. 1. This embodiment of the method does not however require computation of the residual input and output vectors $\bar{s}$, $\bar{r}$ and the orthogonal expansion coefficients $a_{ij}$ and $b_{ij}$; instead, updated estimates for the singular vectors are calculated recursively as follows:

a. First, an SVD dimension counter i is initialized by setting it equal to 1 in a step 45; then in a next step 55 recursive parameters $f_i^v$, $g_i^v$, $f_i^u$ and $g_i^u$ for the left and right singular vectors are initialized according to equations (23), (25), (26), (28).

b. In a next step 65, i$^{th}$ orthogonal correction vectors $\epsilon L_i$ and $\epsilon R_i$ are computed using equations (21), (22).

c. In a next step 75, update estimates for the i$^{th}$ singular vectors and i$^{th}$ singular value $v_i(n)$, $u_i(n)$, $\sigma_i(n)$ are computed according to equations (29), (30) and (31).

d. In a next step 85, index i, or the SVD dimension counter, is compared to the pre-defined number p of tracked dimensions. If i<p, index i is incremented by one, and in a next step 95 the recursive parameters $f_i^v$, $g_i^v$, $f_i^u$ and $g_i^u$ are updated in accordance with equations (23), (24) and (26), (27); after that, steps 65, 75 and 85 are repeated until i=p, and all required singular vectors and singular values are updated.

In a final step 100, the method again outputs the updated and normalized singular vector and singular value estimates $v_i(n)$, $u_i(n)$ and $\sigma_i(n)$, i=1, ..., p.

This embodiment of the method enables realization of a simple rank estimation algorithm for the transfer matrix, which can be included as an additional step to the afore-described method steps after computing of the update parameters $f_i^v$, $g_i^v$, $f_i^u$ and $g_i^u$ for all i=1, ..., p. Rank estimation could be of interest for applications wherein all singular vectors corresponding to substantially non-zero singular values are of interest and need to be periodically updated, i.e. where p has to be equal to rank(H).

Indeed, if H(n) has rank p, then $\sigma_i(n)=0$ for i>p, and therefore the following conditions has to be also satisfied for i>p:

$$f_i^v = f_i^u = 0 \quad (32a)$$

$$g_i^v = g_{i+1}^v, \quad (32b)$$

$$g_i^u = g_{i+1}^u \quad (32c)$$

Changes in rank can therefore be detected by computing the update parameters for i>p, and examining whether either of conditions (32a,b,c) holds with a sufficient accuracy for i=p+1. If either of them breaks down, then p is incremented by one, and the unit vectors $\bar{v}_{p+1}$ and $\bar{u}_{p+1}$, computed by normalizing the residual vectors $\bar{r}$ and $\bar{s}$ in equations (16a,b), are taken as the $(p+1)^{th}$ singular vectors; a corresponding singular value can be found, for example from equation (31).

By way of example, the following APPENDIX gives pseudo-code for adaptive algorithms realizing three different implementations of the method of present invention. The first two algorithms exemplify different versions of the first embodiment illustrated in FIG. 1; the third algorithm is an implementation of the recursive embodiment shown in FIG. 2.

Of course numerous other embodiments may be envisioned without departing from the spirit and scope of the invention.

APPENDIX

Used notations:

K size of input vectors
M size of output vectors
N min(K,M)
p number of tracked dimensions, number of left/right singular vectors to update
s(n) complex input vector at update sample n, with K elements
r(n) complex output vector at update sample n, with M elements
$u_i(n)$ estimated right singular vector at update sample n for $i^{th}$ dimension
$v_i(n)$ estimated left singular vector at update sample n for $i^{th}$ dimension
$\alpha \leq 1$ 'forgetting factor' or the first weighting factor
$\Delta$ stabilization parameter
$\sigma_i(n)$ estimated singular value for $i^{th}$ dimension
$\epsilon$ weighting factor for new data samples, or the second weighting factor, $\epsilon = 1-\alpha$
$z_i(n)$ phase parameter for $i^{th}$ dimension (optional)
$\mu$ phase update parameter (optional)

Algorithm 1: SVD update by computation of orthogonal expansion parameters for p=N:

1. weight new samples $$r(n) = \sqrt{\epsilon} r(n)$$

$$s(n) = \sqrt{\epsilon} s(n)$$

2. project samples onto prior singular vectors

```
for i=1:N
    x_i = u_i^H (n - 1)s(n)
    y_i = v_i^H (n - 1)r(n)
end
```

3. calculate orthogonal expansion of $v_i(n)$ and $u_i(n)$; w and $z_{1i}$ are required only for optional phase correction

```
for i=1:N
    a_ii = 0
    b_ii = 0
    for j = i+1:N
        η = max(δσ_i^2(n - 1),(σ_i^2(n - 1) - σ_j^2(n - 1)))
        κ = y_j · x_i*
        ξ = x_j · y_i*
        a_ji = (κσ_i(n - 1)+ξσ_j(n - 1))/η
        a_ij = -a_ji*
        b_ji = (ξσ_i(n - 1)+ κσ_j(n - 1))/η
        b_ij = -b_ji*
        w = x_i - z_i*(n - 1) · y_i
        z_1i = z_i(n - 1) + μy_i w*
    end
end
```

4. update singular values and singular vectors

```
for i = 1:N
```

$$\sigma_i(n) = \alpha \sigma_i(n-1) + \Re\{y_i \cdot x_i^*\}$$

$$u_i(n) = u_i(n-1) + \sum_{j=1}^{N} b_{ji} u_j(n-1)$$

$$v_i(n) = v_i(n-1) + \sum_{j=1}^{N} a_{ji} v_j(n-1)$$

```
end
```

5. generate and apply residuals if M≠K

```
if M > K, N = K
```

$$\bar{r} = r(n) - \sum_{j=1}^{N} y_j v_j(n-1)$$

$$y_{N+1} = \|\bar{r}\|$$

$$\bar{v} = \bar{r}/y_{N+1}$$

```
for i = 1:N
```

$$a_{N+1,i} = y_{N+1} \cdot x_i^* / \sigma_i(n-1)$$

$$v_i(n) = v_i(n) + a_{N+1,i} \bar{v}$$

```
end
elseif K>M, N = M
```

$$\bar{s} = s(n) - \sum_{j=1}^{N} x_j u_j(n-1)$$

$$x_{N+1} = \|\bar{s}\|$$

$$\bar{u} = \bar{s}/x_{N+1}$$

```
for i = 1:N
```

-continued $$b_{N+1,i} = x_{N+1} \cdot y_i^* / \sigma_i(n-1)$$
$$u_i(n) = u_i(n) + b_{N+1,i} \bar{u}$$
$$\text{end}$$
$$\text{end}$$

6. correct phase if desired for i=1:N
  $v_i(n) = v_i(n) \cdot z_{1i}$
  $z_i(n) = |z_{1i}|$
end 7. normalize singular vectors for i=1:N
  $u_i(n) = u_i(n)/\|u_i(n)\|$
  $v_i(n) = v_i(n)/\|v_i(n)\|$
end Algorithm 2: Adaptive algorithm for updating a subset of singular vectors and singular values by computation of orthogonal expansion parameters, with optional phase correction; p<N 1. weight new samples $$r(n) = \sqrt{\epsilon} r(n)$$
$$s(n) = \sqrt{\epsilon} s(n)$$

2. project samples onto prior singular vectors for i=1:p
  $x_i = u_i^H(n-1)s(n)$
  $y_i = v_i^H(n-1)r(n)$
end 3. generate residuals $$\bar{s} = s(n) - \sum_{j=1}^{p} x_j u_j(n-1)$$
$$\bar{r} = r(n) - \sum_{j=1}^{p} y_j v_j(n-1)$$
$$x_{p+1} = \|\bar{s}\|$$
$$y_{p+1} = \|\bar{r}\|$$
$$u_{p+1}(n-1) = \bar{s}/x_{p+1}$$
$$v_{p+1}(n-1) = \bar{r}/y_{p+1}$$

4. calculate orthogonal expansion of $v_i(n)$ and $u_i(n)$; w and $z_{1i}$ only required for optional phase correction for i=1:p+1
  $a_{ii} = 0$
  $b_{ii} = 0$
  for j = i+1:p+1

$$\eta = \max(\delta\sigma_i^2(n-1), (\sigma_i^2(n-1) - \sigma_j^2(n-1)))$$
$$\kappa = y_j \cdot x_i^*$$
$$\xi = x_j \cdot y_i^*$$
$$a_{ji} = (\kappa \sigma_i(n-1) + \xi \sigma_j(n-1))/\eta$$
$$a_{ij} = -a_{ji}^*$$
$$b_{ji} = (\xi \sigma_i(n-1) + \kappa \sigma_j(n-1))/\eta$$
$$b_{ij} = -b_{ji}^*$$
$$w = x_i - z_i^*(n-1) \cdot y_i$$
$$z_{1i} = z_i(n-1) + \mu y_i w^*$$
  end
end 5. update singular values and singular vectors for i=1:p
$$\sigma_i(n) = \alpha \sigma_i(n-1) + \Re\{y_i \cdot x_i^*\}$$
$$v_i(n) = v_i(n-1) + \sum_{j=1}^{p+1} a_{ji} v_j(n-1)$$
$$u_i(n) = u_i(n-1) + \sum_{j=1}^{p+1} b_{ji} u_j(n-1)$$
end $$\sigma_{p+1}(n) = \alpha \sigma_{p+1}(n-1) + y_{p+1} \cdot x_{p+1}^*$$

6. correct phase if desired for i=1:p
  $v_i(n) = v_i(n) \cdot z_{1i}$
  $z_i(n) = |z_{1i}|$
end 7. normalise singular vectors for i=1:p
  $v_i(n) = v_i(n)/\|v_i(n)\|$
  $u_i(n) = u_i(n)/\|u_i(n)\|$
end Algorithm 3: Low-complexity recursive SVD update 1. weight new samples using $\epsilon = 1-\alpha$ $$r(n) = \sqrt{\epsilon} r(n)$$
$$s(n) = \sqrt{\epsilon} s(n)$$

2. project samples onto prior weight vectors for i=1:p
  $x_i = u_i^H(n-1)s(n)$
  $y_i = v_i^H(n-1)r(n)$
end 3. initialize recursive elements $f^v = r(n)$ $f^u = s(n)$ $g^v = g^u = 0$ 4. update singular values and singular vectors; w and $z_{1i}$ only required for optional phase correction

```
for i=1:p
    σᵢ(n) = ασᵢ(n – 1) + ℜ{yᵢ · xᵢ*}
    κ = xᵢ / σᵢ(n – 1)
    ξ = yᵢ / σᵢ(n – 1)
    f^v = f^v – yᵢ · vᵢ(n – 1)
    f^u = f^u – xᵢ · uᵢ(n – 1)
    v_{1i} = κ*f^v – yᵢ*g^v
    u_{1i} = ξ*f^u – xᵢ*g^u
    g^v = g^v + κvᵢ(n – 1)
    g^u = g^u + ξuᵢ(n – 1)
    w = xᵢ – zᵢ*(n – 1) · yᵢ
    z_{1i} = zᵢ(n – 1) + μyᵢw*
    vᵢ(n) = vᵢ(n – 1) + v_{1i}
    uᵢ(n) = uᵢ(n – 1) + u_{1i}
end
```

5. correct phase if desired

```
for i=1:p
    vᵢ(n) = vᵢ(n) · z_{1i}
    zᵢ(n) = |z_{1i}|
end
```

6. normalize singular vectors

```
for i=1:p
    vᵢ(n) = vᵢ(n)/‖vᵢ(n)‖
    uᵢ(n) = uᵢ(n)/‖uᵢ(n)‖
end
```

What is claimed is:

1. A method of updating singular values and singular vectors in a singular value decomposition (SVD) of a matrix transfer function, the matrix transfer function relating an output vector to an input vector, the method comprising the steps of:
   obtaining initial estimates of the singular values and singular vectors;
   providing the output vector and the input vector;
   projecting the output vector and the input vector onto the initial estimates of the singular vectors to obtain orthogonal projections of the output and input vectors; and,
   determining updated estimates of the singular values and singular vectors from the orthogonal projections of the input and output vectors and the initial estimates of the singular values and the singular vectors.

2. A method of claim 1 wherein the singular vectors comprise right and left singular vectors of the SVD.

3. A method of claim 2 wherein the step of determining updated estimates of the singular values and singular vectors includes the steps of:
   determining updated estimates of p left and p right singular vectors, the p left and p right singular vectors defining the left and right signal subspaces; and,
   determining updated estimates of at least p singular values; wherein p is an integer equal or less than min(M,K), wherein both K and M are integers and wherein K is a dimension of the input vector, and M is a dimension of the output vector.

4. A method of claim 2 further comprising a step of updating a phase of the singular vectors.

5. A method of claim 2 further comprising a step of orthonormalizing the updated estimates of the singular vectors.

6. A method of claim 2 wherein the step of determining updated estimates of the singular values and singular vectors includes weighting of a contribution of the orthogonal projections of the input and output vectors into the updated estimates of the singular values and singular vectors with a weighting factor of less than 1.

7. A method of claim 3 wherein the number p of the updated estimates of the left or right singular vectors is less than min(M,K).

8. A method of claim 3 comprising a step of estimating a rank of the matrix transfer function from one of the orthogonal projections of the output vector onto the left singular vectors and the orthogonal projections of the input vector onto the right singular vectors for detecting a change of said rank.

9. A method of claim 8 comprising a step of updating p in response to detecting the change of the rank of the matrix transfer function.

10. A method of claim 8 comprising a step of setting p to equal the estimated rank of the matrix transfer function.

11. A method of claim 3 wherein the step of determining updated estimates of singular vectors comprises the steps of:
   computing an orthogonal correction vector for each singular vector; and,
   adding the orthogonal correction vector to the initial estimate of a corresponding singular vector.

12. A method of claim 11 wherein the step of computing an orthogonal correction vector for each singular vector further comprises the step of computing (p1) orthogonal expansion coefficients for each singular vector from the orthogonal projections of the output and input vectors onto initial estimates of the right and left singular vectors using the initial estimates of the singular values.

13. A method of claim 11 wherein p is less than min(K,M), further comprising the steps of:
   projecting the input vector and the output vector onto subspaces orthogonal to the right and left signal subspaces respectively to form residual input and output vectors; and
   normalizing the residual input and output vectors to form normalized residual input and output vectors.

14. A method of claim 13, wherein the step of computing an orthogonal correction vector for each singular vector further comprises the steps of:
   computing residual orthogonal expansion coefficients for each of the p left and p right singular vectors from the normalized residual input and output vectors; and,
   using the normalized residual input and output vectors scaled by the corresponding residual orthogonal expansion coefficients to compute the orthogonal correction vectors for the p left and p right singular vectors.

15. A method of claim 11 wherein the orthogonal correction vector is computed using a weighting factor of less than 1.

16. A method of claim 11 wherein the step of computing an orthogonal correction vector for each singular vector comprises the steps of:

recursively computing an orthogonal correction vector for each of the p left singular vectors; and, recursively computing an orthogonal correction vector for each of the p right singular vectors.

17. A method of claim 16 wherein the steps of recursively computing an Orthogonal correction vector for each of the p left and p right singular vectors comprise the steps of recursively calculating weighted projections of the input and output vector onto subspaces of increasing and decreasing dimensions.

18. A method of claim 3 wherein the step of determining updated estimates of the singular values includes, for each of the p singular values, the steps of weighting the initial estimate of the singular value with a first weighting factor to obtain a weighted initial estimate of the singular value, wherein the first weighting factor is less or equal to one;

calculating a weighted correction factor from the orthogonal projections of the input and output vectors onto the initial estimates of the left and right singular vectors corresponding to the particular singular value using a second weighting factor of less than one; and adding together the weighted initial estimate of the singular value and the weighted correction factor.

19. A method of claim 13 wherein the step of determining updated estimates of the Singular values comprises the step of determining updated estimates for singular values corresponding to left and right singular vectors respectively orthogonal to the left and right signal subspaces using a weighted product of the residual input and output vectors.

20. A method of adaptive signal processing in multiple-input multiple-output communication systems comprising the steps of:

transmitting information signal in multiple signal streams with a multiple-output transmitter;

sampling multiple data streams received by a multiple-input receiver to form an output vector;

obtaining an input vector related to the output vector and to a transfer matrix;

obtaining initial estimates of left singular vectors, right singular vectors and singular values of a singular-value decomposition of the transfer matrix;

determining updated estimates of the left singular vectors, right singular vectors and the singular values using the initial estimates thereof and projections of the input and output vectors on the initial estimates of the right and left singular vectors; and, using the updated estimates of the left and right singular vectors and the singular values for performing at least one of: adaptively extracting the information signal from the multiple signal streams received by the receiver, and adaptively emitting the information signal in multiple signal streams by the transmitter.

* * * * *